United States Patent [19]

Langford et al.

[11] 4,116,086

[45] Sep. 26, 1978

[54] CHANGEABLE GATE PLATE MEANS FOR LEVER CONTROL DEVICES

[75] Inventors: William D. Langford, Stow; Dale F. Leuenberger; Howard A. Hazlett, both of Cuyahoga Falls, all of Ohio

[73] Assignee: Incom International, Inc., Pittsburgh, Pa.

[21] Appl. No.: 745,293

[22] Filed: Nov. 26, 1976

[51] Int. Cl.² .................. B62D 1/04; B60K 20/00; G05G 1/04
[52] U.S. Cl. ........................................ 74/532; 74/475; 74/525
[58] Field of Search ................ 74/525, 526, 523, 475, 74/532 U, 533

[56] References Cited

U.S. PATENT DOCUMENTS

| 3,473,404 | 10/1969 | Ross | 74/526 X |
| 3,999,158 | 12/1976 | Rae | 74/526 X |

*Primary Examiner*—Leonard H. Gerin

*Attorney, Agent, or Firm*—Reed, Smith, Shaw & McClay

[57] ABSTRACT

The present invention is addressed to a changeable gate plate means for use with lever control devices which have a mounting plate with an opening therein through which the lever arm of the control devices passes. The changeable gate plate means of the present invention comprises a cover means adapted to mount on said mounting plate of the control device and includes an opening therein substantially co-extensive with the opening in the mounting plate. The cover plate includes a gate plate receiving means located adjacent said opening for removably positioning a gate plate at said opening. The gate plate is positioned within the cover opening and receiving means and includes at least one detent in which the lever arm may travel. Means are included for mounting said cover to the mounting plate to complete the assembly in cooperation with the lever control device.

4 Claims, 9 Drawing Figures

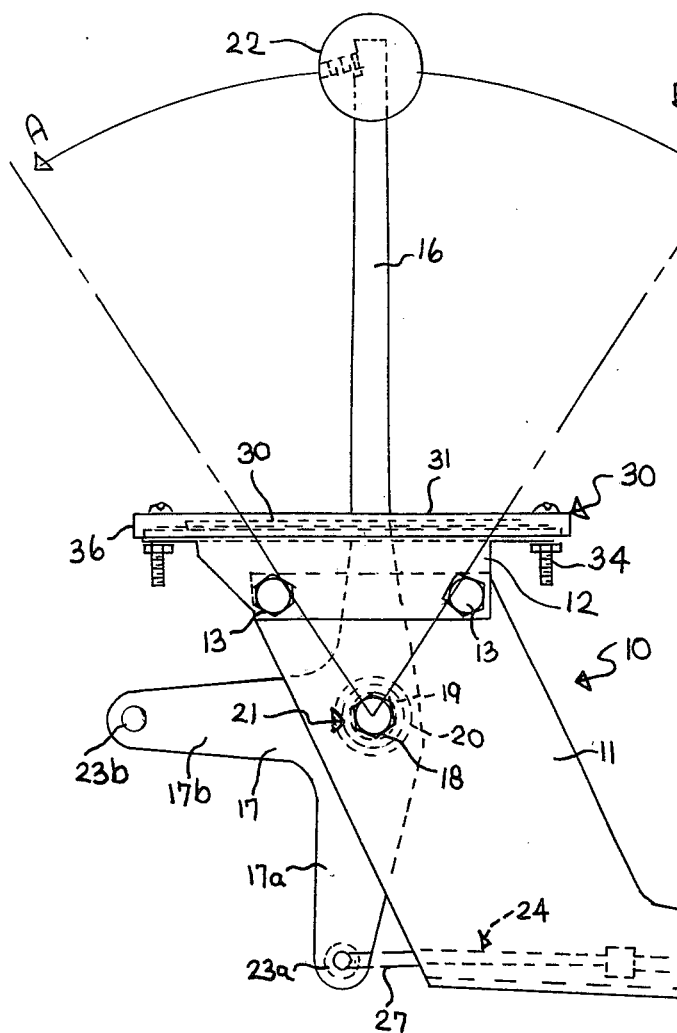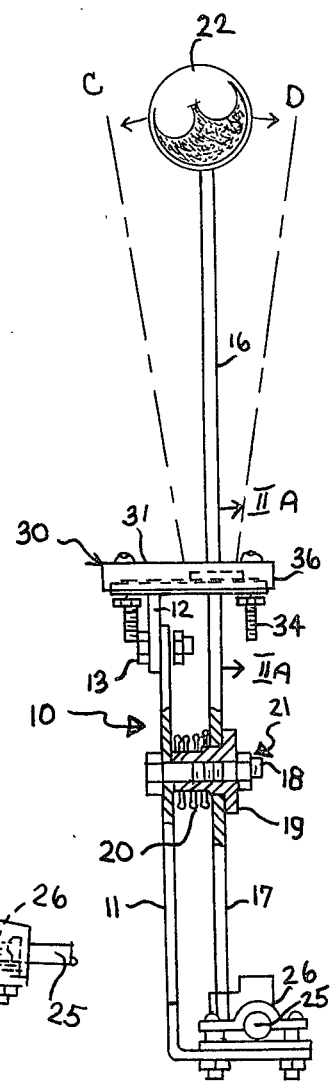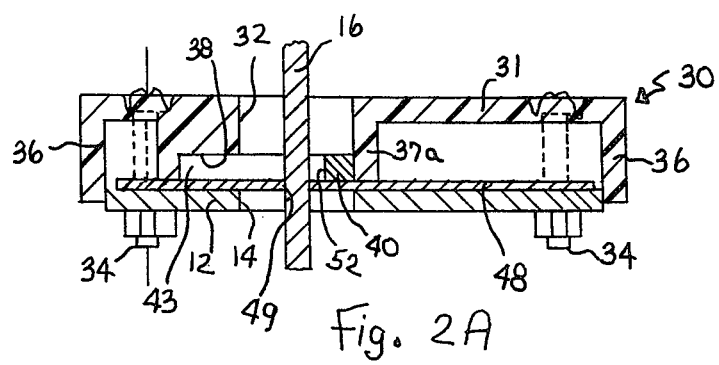
Fig. 1
Fig. 2
Fig. 2A

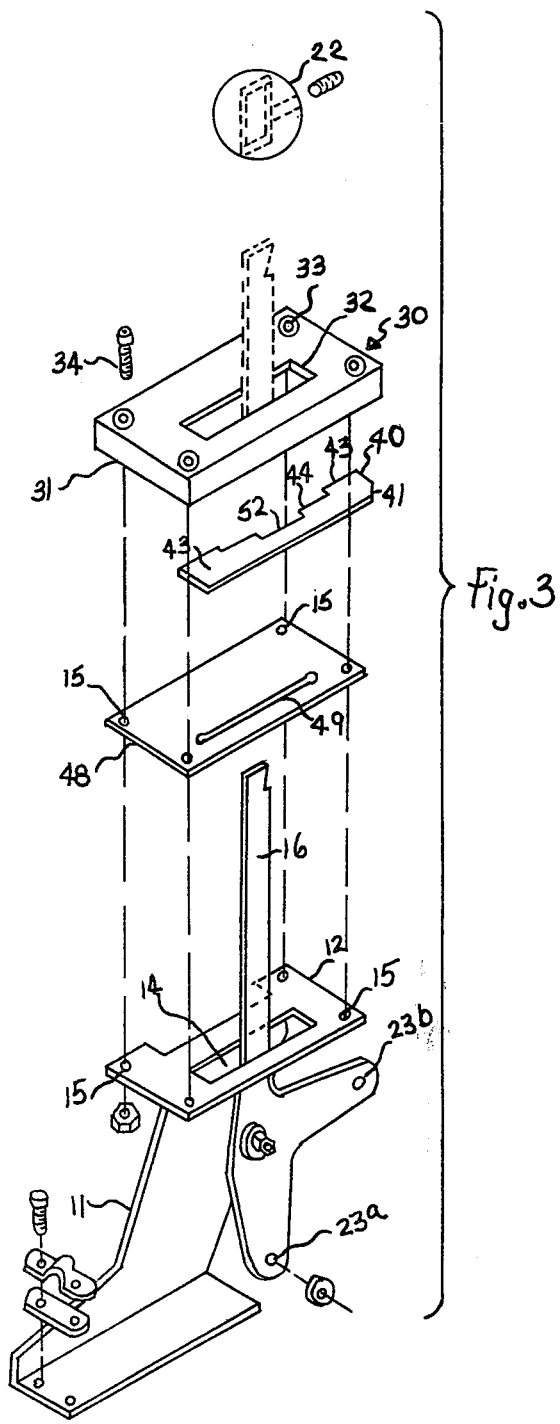
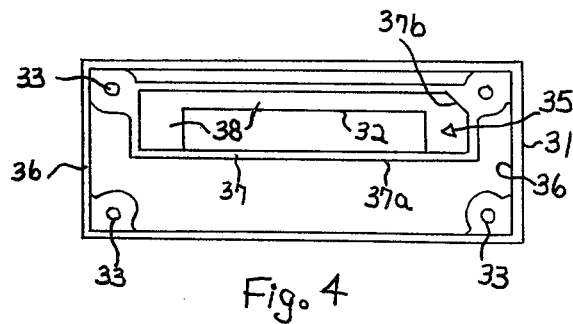
Fig. 4
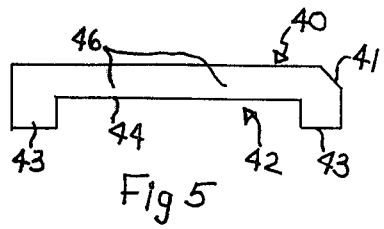
Fig 5
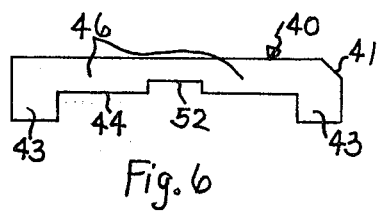
Fig. 6
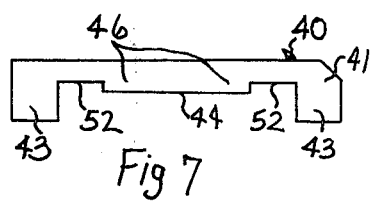
Fig 7
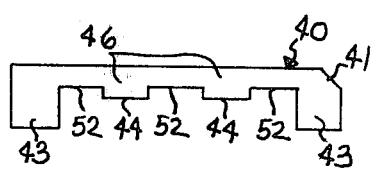
Fig. 8

CHANGEABLE GATE PLATE MEANS FOR LEVER CONTROL DEVICES

FIELD OF THE INVENTION

The present invention relates to a changeable gate plate means for use with lever control devices, and, in particular, to a gate plate means wherein various gate plate configurations can be utilized with a single lever control device.

BACKGROUND OF THE INVENTION

Lever control devices are generally well known and used to remotely control such things as automatic transmissions, hydraulic power take-off devices, and the like. Typically, lever control devices include a mounting means for pivotally mounting a lever arm having a lever actuator operably connected to the device to be controlled. The mounting means includes a mounting plate having an opening therein through which the lever arm projects. Preferably, the lever arm and actuator are biased in a direction normal to the arc through which the lever and actuator travel. The mounting plate in many cases includes a gate plate having detents therein to provide travel stations for the biased lever arm which corresponds to controlled positions on the controlled device. Also, travel stations or positioning means are remotely provided from the mounting plate and comprise additional parts such as roller bearings that engage notched wheels or arcuated plates operably connected to the lever arm or actuator. Connected to the actuator is a cable or other means such as a rod for remotely connecting the control means with the device to be controlled.

Many conventional lever control devices are custom made for the particular end-use application. While the basic configuration of the control, that is, a mounting means, lever arm and actuator, are generally the same for each of the numerous applications, the particular gate plates or station positioner incorporated into the control must be designed for the particular end-use application. The change required in the gate plate configuration or station means to adopt the control to different end uses is expensive and time consuming. In many cases the control lever cannot be adapted to varying end-use application. Furthermore, once the control device has been manufactured for a particular end use, it cannot thereafter be changed by the user or seller without substantial difficulty, it at all.

It is, therefore, an object of the present invention to provide a means for quickly changing the gate plate configuration to adapt a single control device to different end uses. It is a further object of the invention to provide changeable gate plate means whereby the ultimate user of the control device can change the control stations without removing the control from its mounting station. Accordingly, the object of the present invention is to provide a gate plate means that is easily changeable either during manufacture or use to accommodate various control stations or functions with a single control device.

SUMMARY OF THE INVENTION

The present invention overcomes the inherent limitation of prior art single lever control devices. Generally, the invention comprises a gate plate means that is adapted to mount to the mounting plate of a single lever control device wherein said mounting plate includes an opening through which the lever arm of the control passes and in which it is adapted to travel.

The gate plate means includes a cover having an opening therein substantially co-extensive with the opening in the mounting plate. The opening in the cover may be, however, smaller than the opening in the mounting plate if the latter is larger than required to permit full travel of the lever arm in the direction of its travel arc or in a biased direction normal thereto.

The cover includes a gate plate receiving means located adjacent to said opening for positioning a gate plate at said opening. Preferably, the receiving means comprises depending flanges which provide a compression fit for the gate plate and which are adapted to abut the mounting plate or a seal positioned between the cover and mounting plate.

A gate plate having at least one detent or notch in which the lever arm may travel is positioned within the receiving means. The gate plate may comprise one or more than one detent of various travel lengths. A gate plate is positioned within the receiving means preferably by compression fitting.

The cover having the gate plate compressively fit within it the receiving means is mounted to the mounting plate of the lever control device by means of bolts or other fastening devices. Preferably, a seal of rubber or other like material is interpositioned between the cover and the mounting means. The seal may comprise a thin sheet of rubber having a slit therein of a length substantially the same as the opening in the mounting plate through which the lever arm may pass.

By removing the cover plate of the control device and removing the gate plate, a new gate plate having a different configuration can be substituted for the original to provide a new control pattern for the control device. The changeability of the gate plate, therefore, makes it possible to utilize a single controlled lever device for numerous end-use applications. Other advantages of the present invention will become apparent from a perusal of the following detailed description of a presently preferred embodiment taken in connection with the accompanying drawings.

BRIEF DESCRIPTION OF THE DRAWINGS

FIG. 1 is a side elevation of a conventional single lever control device having mounted thereto the changeable gate plate means of the present invention;

FIG. 2 is a front elevation of the control means shown in FIG. 1;

FIG. 2A is a sectional elevation of the gate and cover area of the control means shown in FIG. 2;

FIG. 3 is an exploded perspective view of the gate means of the present invention shown adapted for mounting to a conventional control device;

FIG. 4 is a bottom elevation of the cover plate and;

FIGS. 5-8 show variously configured gate plates for use in the present invention.

PRESENTLY PREFERRED EMBODIMENT

With reference to FIGS. 1 and 2, a conventional single lever control device 10 is shown with changeable gate means 30 of the present invention. Lever control device 10 comprises a mounting support member 11 and mounting plate 12 securely positioned thereon by means of bolts 13. Mounting plate 12 includes an opening 14 therein (FIG. 3) and bolt receiving opening 15. Pivotably mounting to support member 11 is lever arm 16 and actuators or bell-crank 17 having actuator arms 17a and 17b. As shown, actuator 17 is an integral part of lever arm 16, but may be fabricated separately and mounted to lever 16. Lever assembly 16 and 17 are pivotably mounted to support 11 by pivot bolt 18 and lever pivot bushing 19. Coaxially positioned about pivot bushing 19 and between support member 11 and pivot assembly 16 and 17 is lever damper spring 20.

Lever arm 16 passes through opening 14 in mounting plate 12, and, preferably, includes a handle 22 mounted at its outer extremity. By means of pivot means 21 lever arm 16 is adapted to travel arc AB or substantially the length of opening 14 in mounting plate 12. Lever arm 16 by reason of lever pivot bushing 19 and damper spring 20 is capable of lateral displacement through arc CD from the line of travel arc AB.

Actuator 17 includes a pair of openings 23a and 23b in actuator arms 17a and 17b, respectively. A cable 24 for remotely connecting control device 10 with a device to be controlled (not shown) is provided. Cable 24 comprises conduit member 25 rigidly mounted to support member 11 by means of clamp 26. Cable 24 also includes rod member 27 connected to actuator arm 17a through opening 23a using a cable pivot and to cable core (not shown) slidably mounted within conduit 25. By moving lever arm 16 through arc AB actuator arm 17a slidably moves rod 27 in conduit 25 and cable core (not shown) therein to control the device to be controlled. Actuator arm 17b is provided where cable 24 is to be mounted perpendicular to the direction shown in FIG. 1. Thereby, support member 11 is formed to clamp cable in the perpendicular to the direction shown in FIG. 1.

To obtain precise control for a particular controlled device it is necessary to acurately position lever arm 16 along the arc AB of travel. With reference to FIG. 3, changeable gate plate means 30 of the present invention comprises a cover 31, preferably made of plastic, of a shape adapted to cover mounting plate 12. As shown in FIG. 3, cover 31 is a flat rectangular member adapted to mount on to mounting plate 12. However, in may lever control devices, mounting plate 12 may be arcuate necessitating an arcuate cover plate 31. Cover plate 31 includes an opening 32 which is substantially co-extensive with opening 14 of mounting plate 12. Opening 32 and cover plate 31 is adapted to overlie opening 14 in plate 12 to permit passage therethrough of lever arm 16. Cover plate 31 includes openings 33 to receive mounting bolts 34.

Cover plate 31 includes peripheral side walls 36 having a depth sufficient to accommodate a gate plate and preferably an enclosure means between the under surface of said cover and the mounting surface of mounting plate 12. A gate plate receiving means 35 is positioned on the bottom surface of cover plate 31 adjacent to opening 32 therein for receiving a gate plate. Gate plate receiving means 35 preferably comprises depending flanges 37 which define a cavity. Preferably, one of said depending flanges 37a is co-extensive with the edge of opening 32. Said other depending flanges are set back from the edge of opening 32 to define bearing surfaces 38. Preferably, depending flange 37b is angularly offset with respect to said other flanges to define a gate plate alingment means.

A gate plate 40, such as shown in FIGS. 5–8, is positioned within gate plate receiving means 35 by compression fitting. Gate plate 40 preferably includes a notch 41 adapted to conform with depending flanges 37b for alignment within receiving means 35. Preferably, gate plate 40 is made of a metal having a thickness substantially equal to the depth of receiving means 35. Gate plate 40 includes an opening 42 co-existing with opening 14 in mounting plate 12 defined by legs 43 and edge 44. Legs 43 are preferably positioned against depending flange 37a of receiving means 35. Edge 44 of opening 42 defines in cooperation with depending flange 37a the travel way for lever arm 16. Legs 43 of opening 42 are the limit register for the travel way of lever arm 16. The surface of legs 43 and a portion 46 of plate 40 are adapted to rest on bearing surfaces 38.

As shown in FIGS. 6–8, a primary detent 52 may be provided in a gate plate and are preferably positioned along edge 44 of opening 42 to define an additional lever arm register. FIG. 6, for example, may be used for a three positioned control where one of said legs 43 may represent a forward mode of operation and said other leg may represent a reverse mode of operation (i.e., the opposite extremes of travel arc (AB) and detent 52 may represent a neutral position. FIG. 7, on the other hand, may represent a two-station control device where detents 52 each represent a forward or reverse mode having a positive lock-out defined by said detents. FIG. 8, for example, may provide the same type of control as FIG. 6 wherein each control position is positively established.

With reference to FIG. 3, cover plate 31 having gate plate 40 compressively fit within receiving means 35 is mounted to mounting plate 12. Preferably, a dust seal 48 made from thin rubber stock is positioned between cover plate 31 and mounting plate 12. Seal 48 includes a slit 49 having a length substantially the same as the length of opening 32 in cover 31 to prevent passage of lever arm 16 therethrough. Seal 48 prevents foreign material from entering into the control device.

The present invention thus provides a gate plate means that is easily changeable either during manufacture or use to accommodate various control stations or functions with a single lever control device. While presently preferred embodiments of the invention have been shown and described in particularily, the invention may be otherwise embodied within the scope of the appended claims.

What is claimed is:

1. A changeable gate plate means for lever control devices having a mounting plate with an opening therein through which the lever passes, said gate plate means comprising a. a cover means adapted to mount on said mounting plate including an opening therein substantially coextensive with said opening in the mounting plate and a gate plate receiving means positioned adjacent said opening for removably positioning a gate plate at said opening and comprising a cavity formed integrally with the cover means having a peripheral cage adapted to abut said mounting plate; and b. a gate plate removably positioned within said receiving means and including at least one opening in which said lever may travel and at least two stops for limiting travel of said lever.

2. A changeable gate plate means as set forth in claim 1 wherein said receiving means compressively engages said gate plate.

3. A changeable gate plate means as set forth in claim 1 wherein said cavity is defined by depending flanges, one of said flanges being positioned adjacent to and slightly longer than the edge of said opening in said cover means, said other flanges being set back from the respective other edges of said opening to define a bearing surface with said cover means.

4. A changeable gate plate means as set forth in claim 1 including a seal means positioned between said cover means and said mounting means, said seal being substantially co-extensive with the area defined by said cover means and including an elongated slit positioned between the openings in said cover means and mounting plate adapted for passage of said lever.

* * * * *